United States Patent
Wewers et al.

(10) Patent No.: US 6,272,118 B1
(45) Date of Patent: Aug. 7, 2001

(54) SYNCHRONIZABLE BASE STATIONS OF A WIRELESS MULTI-CELL TELECOMMUNICATION SYSTEM AND A METHOD OF SYNCHRONIZING SAME

(75) Inventors: Otger Wewers, Bocholt; Rolf Biedermann, Hamminkeln, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/043,941

(22) PCT Filed: Sep. 19, 1996

(86) PCT No.: PCT/DE96/01782

§ 371 Date: Mar. 27, 1998

§ 102(e) Date: Mar. 27, 1998

(87) PCT Pub. No.: WO97/13335

PCT Pub. Date: Apr. 10, 1997

(30) Foreign Application Priority Data

Sep. 29, 1995 (DE) .............................. 195 36 587

(51) Int. Cl.[7] .............................. H04Q 7/00; H04Q 7/20; H04B 7/212; H04J 3/06; H04L 7/06
(52) U.S. Cl. .......................... 370/330; 370/337; 370/347; 370/350; 375/364; 455/422; 455/502
(58) Field of Search ................................... 370/350, 337, 370/328, 339, 329, 503, 510, 512, 509, 522, 524, 310, 347, 330; 375/356, 363, 364; 455/502, 442, 426, 422, 443

(56) References Cited

U.S. PATENT DOCUMENTS

| | | | |
|---|---|---|---|
| 5,184,347 | * | 2/1993 | Farwell et al. ................... 370/94.1 |
| 5,388,102 | | 2/1995 | Griffith et al. . |
| 5,410,588 | * | 4/1995 | Ito .................................. 379/58 |
| 5,448,570 | * | 9/1995 | Toda et al. ....................... 370/95.3 |
| 5,784,368 | * | 7/1998 | Weigand et al. .................. 370/310 |
| 5,787,078 | * | 7/1998 | Geywitz et al. ................... 370/331 |

FOREIGN PATENT DOCUMENTS

| | | |
|---|---|---|
| 28 12 774 | 9/1979 | (DE) . |
| 42 15730 A1 | 11/1993 | (DE) . |
| 43 22 497 A1 | 1/1995 | (DE) . |
| 43 32 999 A1 | 3/1995 | (DE) . |
| 0 466 736 B1 | 1/1992 | (EP) . |
| WO 94/18764 | 8/1994 | (WO) . |
| WO 96/38990 | 12/1996 | (WO) . |

OTHER PUBLICATIONS

Informatik—Spektrum (1991) 137–152.
Hochoptimierte ICs fur DECT/Schnurlos–telefone pp. 215/218.
Sprache und Daten schnurlos ubertragen pp. 74/78.
Wege zur universellen mobilen Telekommunikation pp. 35/42.
Struktur des DECT Standards pp. 23/29.
Schnittstellen in der Telekommunikation Teil 1: Standardisierung in der Telekommunikation—ein Uberblick pp. 99/190.
ITG Fachbericht 124—Mobile Kommunikation pp. 277/289.

* cited by examiner

Primary Examiner—Alpus H. Hsu
Assistant Examiner—Duc Ho
(74) Attorney, Agent, or Firm—Bell, Boyd & Lloyd LLC

(57) ABSTRACT

The base stations of a wireless multi-cell telecommunication system receive a time signal radio message sent by a time transmitter, with which the base station-specific function executions of the base stations oriented to a telecommunication standard for the wireless telecommunication in the multi-cell telecommunication system can be controlled synchronized in time.

7 Claims, 2 Drawing Sheets

SYNCHRONIZABLE BASE STATIONS OF A WIRELESS MULTI-CELL TELECOMMUNICATION SYSTEM AND A METHOD OF SYNCHRONIZING SAME

BACKGROUND OF THE INVENTION

1. Field of the Invention

The present invention relates to base stations of a wireless multi-cell telecommunication system which are oriented to a particular telecommunication standard and which receive a time signal radio message sent by a time signal transmitter so that function executions of the base stations can be controlled synchronized in time.

2. Description of the Prior Art

A wireless multi-cell telecommunication system is a message system with a wireless message transmission path between a message source and a message sink for message processing and transmission, wherein the messages are processed in a cell related manner at every x-arbitrary location of the message system (mobile character of the message system) and transmitted in a cell-related or cell-overlapping manner. Whereas the cell-related transmission occurs exclusively wirelessly, the cell overlapping message transmission can be wireless/wire-bound or wireless. The message processing and transmission can thereby occur in either a preferred transmission direction (simplex mode) or in both transmission directions (duplex mode). Moreover, the message processing can be analog or digital. The message processing and the wireless message transmission preferably occurs according to various radio standards such as DECT, WCPS (American version of DECT), GSM including the derivative DCS1800, ADC (American version of GSM), JDC (Japanese version of GSM), etc. Other wireless types of transmission such as, for example, infrared transmission can also be utilized as wireless transmission technology in addition to the radio transmission.

"Message" is a higher ranking term that stands both for the denotational content (information) as well as for the physical representation (signal). For example, signals can represent
(1) images
(2) spoken words
(3) written words
(4) encrypted words or images.

For example, wireless multi-cell telecommunication systems of the type outlined above are cellular DECT systems (Digital European Cordless Telecommunication, see (1), Nachrictentechnik Elektronik 42 (1992) January/February, No. 1, Berlin, DE, U. Pilger, "Struktur des DECT-Standards", pp. 23–29; (2) telecom report 16 (1993) No. 1, J. H. Koch, "Digitaler Komfort für schnurlose Telecommunikation-DECT-Standard eröffnet neue Nutzungsgebiete", pp. 26 and 27; (3) tec 2/93-Das technishe Magazin von Ascom "Wege zur universellen mobilen Telekommunikation", pages 35–42; (4) Funkschau (1194) No. 23, "Sprache und Daten schnurlos übertragen", pp. 74–78) or GAP systems (Generic Access Profile; ETSI publication prETS 300 444, April 1995, Final Draft, ETSI, FR) that can be constructed according to the illustration in FIG. 1. Such DECT/GAP-specific multi-cell telecommunication systems are summarized under the term "Cordless Multicell Integration (CMI)". The GAP systems are a matter of specific DECT systems wherein, in particular, the interoperability of DECT voice applications is assured.

FIG. 1 shows a DECT/GAP radio area FB formed gap-free by, for example, three DECT/GAP radio cells FZ1 . . . FZe. DECT/GAP base stations RFP1 . . . RFP3 (Radio Fixed Part) are arranged in the radio cells FZ1 . . . FZ3 in the cell centers. A first DECT/GAP base station RFP1 is thus located in a first DECT/GAP radio cell FZ1, a second DECT/GAP base station is located in a second DECT/GAP radio cell FZ2 and a third DECT/GAP base station RFP3 is located in a third DECT/GAP radio cell FZ3. The three base stations are connected via a switching system VS to, for example, a public telephone network PSTN (Public Switched Telephone Network) and are thus connected to one another. EP-0 466 736 B1 discloses that the switching system VA is fashioned as private branch exchange PABX (Private Automatic Branch EXchange).

According to the subsequently published international application PCT/DE96/00933 (Publication Number WO 96/38990) that proceeded from German Patent Application P 19 519 966.9 in combination with U.S. Pat. No. 5,388,102 and the publication Nachrichtentechnik Elektronik, Berlin 41–42, Part 1 through 10, Part 1: (1991) No. 3, pages 99–102; Part 2: (1991) No. 4, pages 138–143; Part 3: (1991) No. 5, pages 179–182 and No. 6, pages 219–220; Part 4: (1991) No. 6, pages 220–222 and (1992) No. 1, pages 19–20; Part 5: (1992) No. 2, pages 59–62 and (1992) No. 3, pages 99–102; Part 6:(1992) No. 4, pages 150–153; Part 7: (1992) No. 6, pages 238–241; Part 8: (1993) No. 1, pages 29–33; Part 9: (1993), No. 2, pages 95–97 and (1993) No. 3, pages 129–135; Part 10: (1993) No. 4, pages 187–190, it is also possible to connect the three base stations RFP1 . . . RFP3 to the switching system VS via an $S_0$ bus. To that end, the switching system VS includes an interface SS that
(1) serves as network termination NT (Network Termination) when the switching system VS is fashioned as digital local exchange DOVS,
(2) serves as $S_0$ interface $S_0$-SS when the switching system VS is fashioned as private branch exchange PABX,
(3) serves as private branch exchange PABX when the switching system VS is fashioned as local exchange OVS.

Within its radio cell FZ1 . . . FZ3, each base station RFP1. RFP3 can set up and maintain a maximum of 12 telecommunication connections in parallel to DECT/GAP mobile parts PP (Portable Part) via a DECT air interface designed for the frequency range between 1.88 and 1.90 GHz.

Proceeding from the publication Components 31 (1993), No. 6, pages 215–218, S. Althammer, D. Brückmann, "Hochoptimierte IC's für DECT-Schnurlostelefone", FIG. 2 shows the fundamental circuit structure of the base stations RFP1 . . . RFP3 of FIG. 1. This is composed of a radio part FKT, a signal processing means SVE with a signal control part SST fashioned as time switch controller TSC with switching functions (switch functions), a signal shaping part SUT fashioned as CODEC and AD/DA converter, a clock generator TG, a microcontroller MIC, a line interface LSS to the switching system VS and a power supply SVG. All components are connected to one another in the illustrated way. The fundamental functioning of the circuit structure in combination with the mobile part is described, for example, in the above-cited publication.

For example, a total of 10 mobile parts PP are located in the radio area FB of FIG. 1, whereof a first mobile part PP1, a second mobile part PP2 and a third mobile part PP3 are allocated to the first base station RFP1, a fourth mobile part PP4, a fifth mobile part PP5, a sixth mobile part PP6, a seventh mobile part PP7 and the third mobile part PP3 are allocated to the second base station RFP2 and an eighth mobile part PP8, a ninth mobile part PP9, a tenth mobile part PP10 and the seventh mobile part PP7 are allocated to the third base station RFP3. The third mobile part PP3 is capable of telecommunication with the first base station RFP1 as well as with the second base station RFP2 because it is located in the overlap region of the first radio cell FZ1 and the second radio cell FZ2. Analogous thereto, the seventh mobile part PP7, which is located in the overlap region of the second radio cell FZ2 with the third radio cell FZ3, is capable of telecommunication with the second base station RFP2 as well as with the third base station RFP3.

For the operation of the cellular DECT/GAP system of FIG. 1, in the sense of a mobile telecommunication, the realization of system-specific performance features such as roaming (moving through the radio area with a mobile part), handover (handing over a duplex radio connection "base station—mobile part") within a cell (intra-cell handover) and in the overlap area of two radio cells (inter-cell handover) [sic], synchronization of the base stations existing in the system is assumed analogous to the cellular mobile radiotelephone system, for example according to the GSM standard (Groupe Spécicale [sic] Mobile or Global System for Mobile communication, see Informatik Spektrum 14 (1991) June, No. 3, Berlin, DE, A. Mann, "Der GSM-Standard-Grundlage für europäische Mobilfunknetze", pages 137–152). A corresponding synchronization of the function executions sequencing in the DECT/GAP system according to FIG. 1 is required therefor. In order to thereby forego a coordination from the outside, i.e. from the line-bound public telephone network, the Dynamic Channel Allocation method (DCA method) is provided according to the DECT standard. When, for example, a DECT connection is set up, that frequency and that time window with the least interference is [sic] sought. The intensity (strength) of the interference is mainly dependent on whether (a) a cell is already being conducted at another base station or (b) a mobile part, due to movement, comes into visual contact with a previously occluded base station.

An increase of the interference deriving therefrom can be countered with the TDMA transmission method (Time Division Multiple Access) on which the DECT/GAP system is based. According to the TDMA method, only one time slot is used for the actual transmission; the other eleven time slots can be employed for measurements. As a result, an alternative frequency/time slot pair onto which the connections can be switched can be identified. This occurs by means of a "connection handover" (intra-cell handover) within the framework of an adaptive channel allocation according to the DECT standard (see Nachrichtentechnik Elektronik 42 (1992) January/February, No. 2, Berlin, U. Pilger, "Struktur des DECT-Standards", page 28.3.2.6).

In order to then get a handle on the "inter-cell handover" problem that occurs regularly in cellular DECT systems in addition to "intra-cell handover", the mobile part provided for such cellular DECT/GAP systems must be in the position at every point in time of an active telecommunication connection to a base station to change the base station, due to a cell change within the radio area (setup of a telecommunication connection to a different base station when the mobile part is located in an overlap region of two radio cells). Such positioning is also necessary to thereby hand over the already existing, active telecommunication interruption-free (seamless) to the base station (seamless handover).

According to the publication Nachrichtentechnik Elektronik 42 (1992) January/February, No. 1, Berlin, U. Pilger, "Struktur des DECT-Standards", page 28.3.2.6, the DECT standard provides that the mobile part, given a deterioration of the transmission quality of the existing telecommunication connection, independently sets up a second telecommunication connection parallel to the existing connection on the basis of indicators (for example, signal field strength, CRC values, etc.) indicating the transmission quality. In this "inter-cell handover" procedure, the fact that the mobile part is constantly informed of the status of the channels available in the momentary environment within the framework of the dynamic, decentralized channel allocation is utilized such that the second connection is set up on the basis of the entry into a channel list.

An interruption-free handover is only possible with the above procedure when the mobile part is located in a DECT/GAP system with synchronized base stations. In such a synchronous cellular system, the mobile part, in addition to the already existing telecommunication connection to a base station (originating base station), can then set up a further connection to another base station of another radio cell without losing the synchronism to the originating base station. Such a synchronous cellular DECT/GAP system could hitherto be realized only with substantial system outlay on the basis of an additional wire connection between the base stations.

DE 42 15 730 A1 discloses a cellular time slot radio system with at least one radio center, a plurality of addressable radio positions and a plurality of single-channel signal receivers, wherein the radio center broadcasts a data telegram intended for a signal receiver that contains the receiver address and a message in a time slot synchronized by its own time normal or by the time normal sent via the external time transmitter DCF77. This data telegram is received by the signal receiver, either directly or via a radio location or a plurality of radio locations, which then forwards the data telegram which is then interpreted. The data telegram contains a time slot criterion that indicates the current time slot of the transmitting radio center or radio location. The radio locations that can be reached by the radio center interpret the data telegram such that the radio locations are synchronized by the time slot criterion. The data of the data telegram are intermediately stored by the addressed radio location. The addressed radio location replaces the time slot criterion received from the radio center with its own time slot criterion and transmits the intermediately stored data together with its own time slot criterion as a new data telegram in a time slot allocated to it. When neighboring radio locations transmit a data telegram at the same time, the synchronism required is achieved in every radio location either by the data telegram received from the radio center or by the time normal sent from the time transmitter DCF77.

DE-28 12 774 A1 discloses a method and an apparatus for offering synchronization pulses for the wireless, mutual data transmission between a plurality of stations, wherein the synchronization pulses are derived from time signal output by a time signal transmitter and, potentially, from frequency information output by a normal frequency transmitter with high frequency constancy.

WO 94/18764 discloses a duplex communication system wherein two radio base stations are connected to an ISDN private branch exchange via a respective wire connection. Each base station respectively contains an ISDN interface, a control means, a transmission/reception means and a clock means. For controlling the frequency of the clock devices in the base stations, a common clock is derived from the ISDN private branch exchange and transmitted to the individual base stations via the wire connections.

SUMMARY OF THE INVENTION

The present invention is directed toward improving the time resolution of synchronization information in the synchronization of base stations of a wireless multi-cell telecommunication system (for example, a DECT-specific CMI system (Cordless Multicell Integration)).

Accordingly, in an embodiment of the present invention, the base stations of a wireless multi-cell telecommunication system of the species initially cited, for example, a cellular DECT/GAP system, receive a time signal radio message, for example, the DCF77 signal, sent by a time signal transmitter with which the base station-specific function executions of the base stations oriented to a telecommunication standard, for example, the DECT/GAP standard, for the wireless telecommunication in the multi-cell telecommunication system can be controlled synchronized in time. For example, the DECT/GAP bit clock is controlled with a carrier signal contained in the time signal radio message that is very exact with respect to the frequency. Over and above this, for example, the DECT/GAP time slot clock and/or time frame clock is controlled with time information contained in the time signal radio message that is modulated on the carrier signal.

Moreover, the DECT/GAP time slot clock and/or time frame clock is controlled with further time information, for example, the frame clock of the SO bus via which the base stations are connected to one another, in addition to the time information contained in the time signal radio message.

Additional features and advantages of the present invention are described in, and will be apparent from, the Detailed Description of the Preferred Embodiments and the Drawings.

DETAILED DESCRIPTION OF THE PREFERRED EMBODIMENTS

Figure 1:
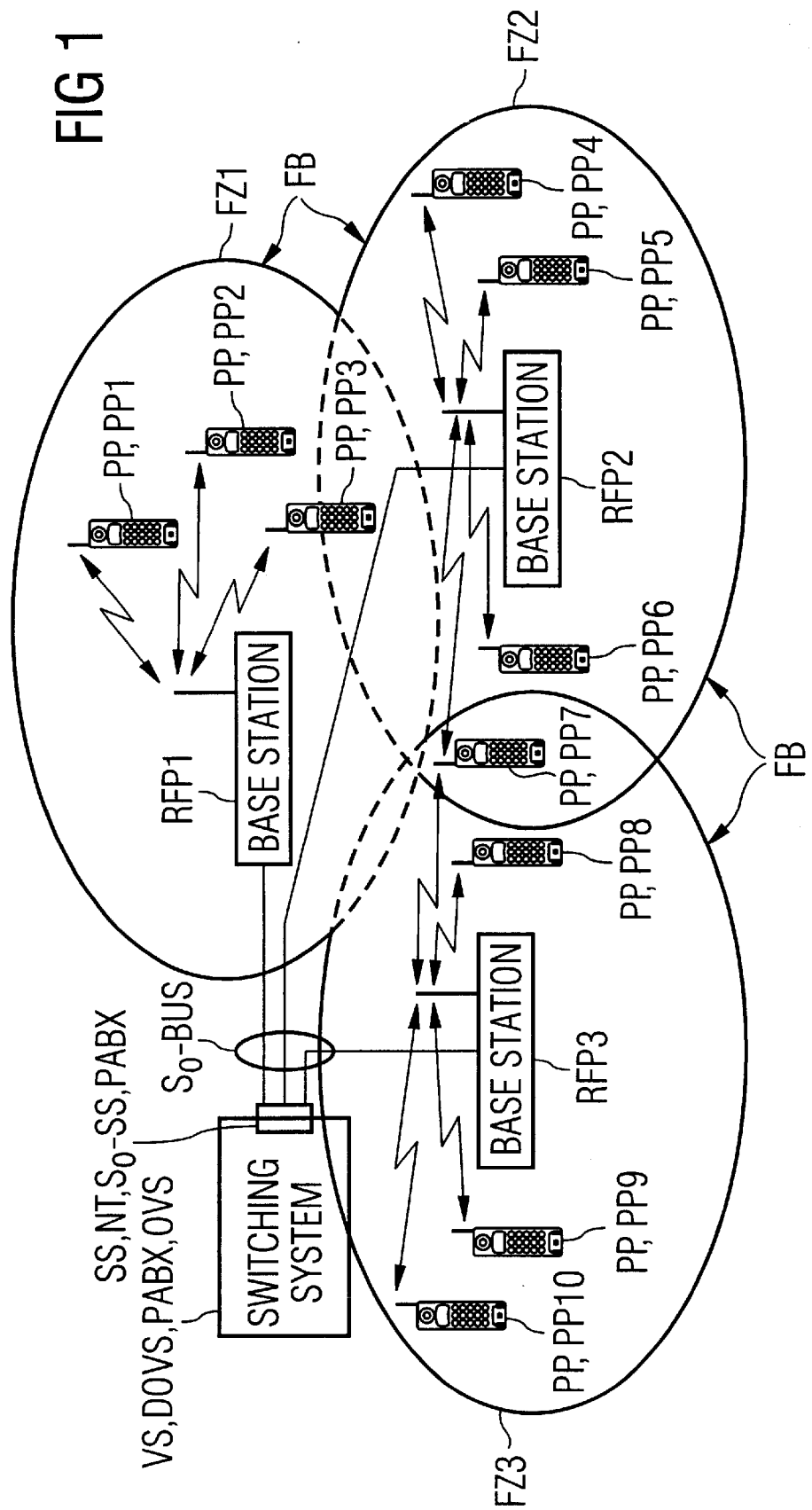
FIG. 1 shows a DECT/GAP radio area FB formed gap-free by, for example, three DECT/GAP radio cells FZ1 . . . FZ3.
Figure 2:
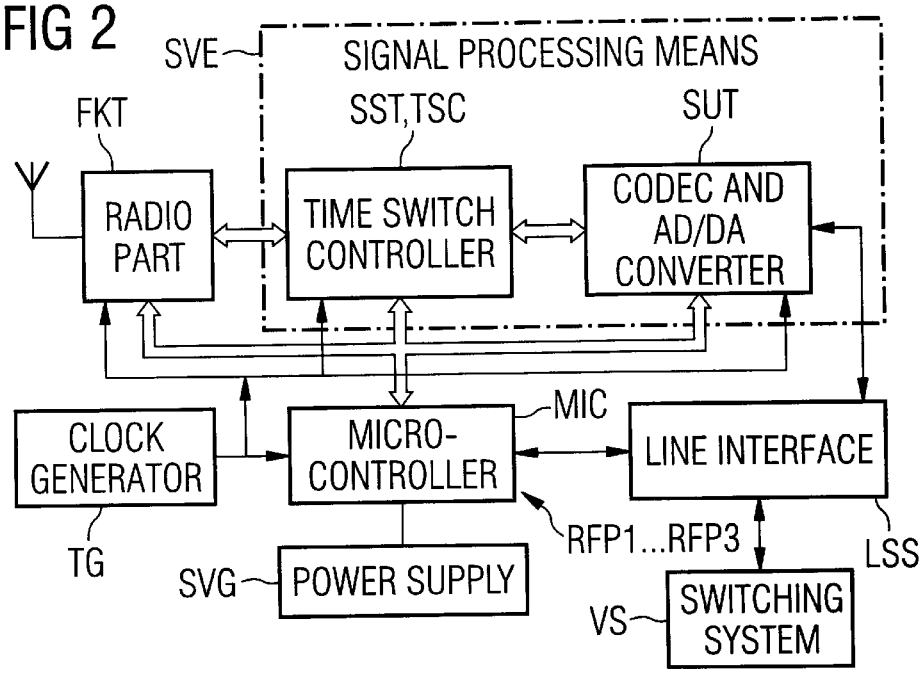
FIG. 2 shows the fundamental circuit structure of the base stations RFP1 . . . RFP3 of FIG. 1.
Figure 3:
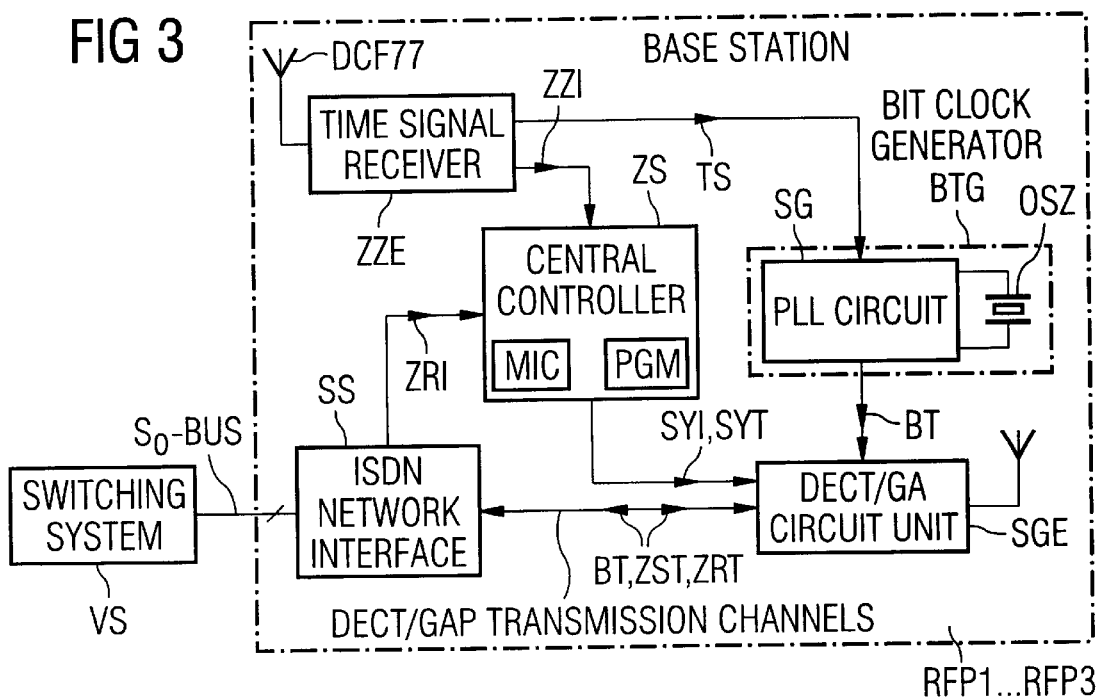
FIG. 3 shows an expanded circuit structure of the base stations RFP1 . . . RFP3 in accordance with the teachings of the present invention.

Proceeding from the circuit structure according to FIG. 2, FIG. 3 shows an expanded circuit structure of the base stations RFP1 . . . RFP3. With this expanded circuit structure, the base stations RFP1 . . . RFP3 are in the position of synchronizing the time execution of the DECT-specific function sequences. These DECT-specific function executions occur in a DECT circuit unit SGE. The circuit unit SGE contains the radio part FKT and the signal processing means SVE of FIG. 2. The line interface LSS of FIG. 2 is fashioned as ISDN interface SS in that the base stations RFP1 . . . RFP3 of FIG. 1 are connected to the switching system VS via the $S_0$ bus. The DECT/GAP transmission channels set up b the DECT/GAP circuit unit SGE according to the DECT/GAP standard in the framework of the function executions in the base stations RFP1 . . . RFP3 are connected to the $S_0$ by the ISDN interface SS. A central control ZS that also comprises further program modules PGM in addition to the micro-controller MIC of FIG. 2 is provided in the base stations RFP1 . . . RFP3 for controlling the function executions in the base stations RFP1 . . . RFP3. Analogous to the illustration in FIG. 2, the power and clock supply of the central controller ZS is assumed by the power supply SVG or, respectively, the clock generator TG. Accordingly, the setup of the DECT/GAP transmission channels in the framework of the base station-specific function executions sequences synchronously in the individual base stations RFP1 . . . RFP3. The central controller ZS is connected to a time signal receiver ZZE. A time signal radio message DCF77 sent by a time transmitter can be received with this time signal receiver ZZE. The time signal radio message DCF77 is composed of a carrier signal TS with a carrier frequency f (for example, f=77.5 kHz) and a time signal information ZZI imposed on the carrier signal TS by amplitude modulation. Whereas the carrier signal TS is supplied to a bit clock generator BTG for the DECT/GAP circuit unit SGE, the time signal information ZZI is supplied to the central controller ZS.

The bit clock generator BTG is a component part of the clock generator TG of FIG. 2 and comprises a PLL circuit SG with a crystal oscillator OSZ. The bit clock generator BTG delivers a DECT/GAP bit clock BT to the DECT/GAP circuit unit SGE for the setup of the DECT/GAP transmission channels. As a result of the carrier signal TS supplied to the bit clock generator BTG, this can be retuned with respect to the oscillator frequency offered by the crystal oscillator OSZ. The carrier frequency f coupled with a high-precision frequency normal in the time signal transmitter thereby serves as frequency reference for the bit clock generator BTG. As a result thereof, on the one hand, the DECT/GAP bit block BT output by the bit block generator BTG can be quite exact and, on the other hand, a synchronization of the base stations RFP1 . . . RFP3 with respect to the DET/GAP bit clock BT can be achieved.

The time signal information ZZI supplied to the central controller is an encoded time signal information with the specification of time quantities such as year, month, week, day, hour, minute and second. From the time information ZZI, the central controller ZS, with the micro-controller MIC and the program modules PGM, forms a synchronization information SIGH that is supplied to the DECT/GAP circuit unit SGE. On the basis of this synchronization information SYI, a DECT/GAP time slot clock ZST and a DECT/GAP time frame clock ZRT of the DECT/GAP transmission channels is matched in the DECT/GAP circuit unit SGE to a synchronization clock SYT contained in the synchronization information SYI. The matching can thereby have such an appearance that the DECT/GAP time frames having a respective duration of 160 ms respectively begin in a declared time grid; for example, at every full minute. In order to improve the resolution of the synchronization information SYI (1/f-13 µs) acquired from the time signal information ZZI, the central controller ZS receives a time frame information ZRI of the $S_0$ bus from the ISDN interface in which the frame clock of the $S_0$ bus is contained. The maximum deviation between two pieces of terminal equipment (terminal end points) operated at the SO bus amounts to 2 µs.

Although the present invention has been described with reference to specific embodiments, those of skill in the art will recognize that changes may be made thereto without departing from the spirit and scope of the invention as set forth in the hereafter appended claims.

What is claimed is:

1. A method for synchronizing a plurality of base stations of a wireless multi-cell telecommunication system, comprising the steps of:

allocating each of the plurality of base stations to one of a plurality of radio cells of the multi-cell telecommunication system;

connecting the plurality of base stations to a switching system;

receiving at each of the plurality of base stations a time signal radio message which includes both a carrier signal and first time information data wherein the first time information data is modulated onto the carrier signal in a periodic time spacing;

prescribing a respective first time measure for each of the plurality of base stations, the first time measure based on a telecommunication standard that measures function executions in each respective base station;

matching each respective first time measure to a first frequency defined by the carrier signal;

receiving at each of the plurality of base stations second time information data which includes a clock information determinant for a connection between each respective base station and the switching system;

prescribing at least one respective second time measure for each of the plurality of base stations, the second time measure based on the standard that measures function executions in each respective base telecommunication station; and matching each respective second time measure to both a second frequency defined by the first time information data and a third frequency defined by the second time information data.

2. A method as claimed in claim 1, further comprising the steps of:

repeating the step of matching each respective first time measure on a periodic basis; and repeating the step of matching each respective second time measure on a periodic basis.

3. A method as claimed in claim 1, further comprising the steps of:

providing DECT/GAP—specific cordless base stations as the base stations;

providing a DECT/GAP—specific cellular cordless telecommunication system as the telecommunication system;

providing a DECT/GAP standard as the telecommunication standard;

providing a DECT/GAP bit clock as part of the first time measure and as part of the at least one second time measure; and providing either a DECT/GAP time slot or a DECT/GAP time frame as part of the at least one second time measure.

4. A method as claimed in claim 1, further comprising the steps of:

connecting the base stations to an $S_0$ bus; and providing an $S_0$ time frame on the $S_0$ bus as the second time information data.

5. A base station arranged in a radio cell of a wireless multi-cell telecommunication system, the base station being connected to a switching system and having function executions oriented to a wireless telecommunication standard of the multi-cell telecommunication system, the base station comprising:

a receiver for receiving a time signal radio message which includes both a carrier signal and first time information data wherein the first time information data is modulated onto the carrier signal in a periodic time spacing;

a controller connected to the receiver;

a first time measure prescribed by a telecommunication standard that measures function executions in the base station, wherein the controller matches the first time measure to a first frequency defined by the carrier signal;

at least one second time measure prescribed by the telecommunication standard that measures function executions in the base station, wherein the controller matches the at least one second time measure to a second frequency defined by the first time information data; and an interface device connected to the controller for receiving second time information data which includes a clock information determinant for a connection between the base station and the switching system, and wherein the controller matches the second time measure to a third frequency defined by the second time information data.

6. A base station as claimed in claim 5, further comprising:

an $S_0$ bus to which the interface device is connected, wherein the second time information data is an $S_0$ time frame transmitted on the $S_0$ bus.

7. A base station as claimed in claim 5, further comprising:

a DECT/GAP—specific cordless base station as the base station;

a DECT/GAP—specific cellular cordless telecommunication system as the telecommunication system;

a DECT/GAP standard as the telecommunication standard;

a DECT/GAP bit clock as part of the first time measure and part of the at least one second time measure; and either a DECT/GAP time slot or DECT/GAP time frame as part of the at least one second time measure.

* * * * *